United States Patent [19]

Videc

[11] 4,199,796
[45] Apr. 22, 1980

[54] TAPE GUIDE ARRANGEMENT FOR A TRANSVERSELY SCANNING MAGNETIC RECORDER

[75] Inventor: Bernard P. Videc, Eindhoven, Netherlands

[73] Assignee: U.S. Philips Corporation, New York, N.Y.

[21] Appl. No.: 885,616

[22] Filed: Mar. 13, 1978

[30] Foreign Application Priority Data

Apr. 27, 1977 [NL] Netherlands .......................... 7704581

[51] Int. Cl.² ............................................. G11B 15/60
[52] U.S. Cl. ................................................. 360/130.22
[58] Field of Search ..................... 360/130, 84, 130.22, 360/130.23

[56] References Cited

U.S. PATENT DOCUMENTS

| | | | |
|---|---|---|---|
| 3,080,169 | 3/1963 | Lyon | 360/130 |
| 3,972,074 | 7/1976 | Vogel | 360/130 |
| 4,100,585 | 7/1978 | Van Slageren | 360/130 |

*Primary Examiner*—Robert S. Tupper
*Attorney, Agent, or Firm*—David R. Treacy

[57] ABSTRACT

A transversely scanning magnetic tape recorder having a concave tape guide member which shapes and aligns the tape at a location by the rotating magnetic heads and between two cylindrical tape guides. The magnetic tape is deformed in cross-section from straight to curved and then back from curved to straight. To prevent kinks and folds in the magnetic tape as a result of this deformation, tape curving means exert pressure on the magnetic tape to increase the local degree of curvature of the magnetic tape. As a result, differences in local membrane stress in the tape cross-section at the location of the rotary magnetic head paths are reduced.

8 Claims, 13 Drawing Figures

TAPE GUIDE ARRANGEMENT FOR A TRANSVERSELY SCANNING MAGNETIC RECORDER

BACKGROUND OF THE INVENTION

The invention relates to a transversely scanning magnetic-tape recording/playback apparatus, and more particularily to an apparatus of that type especially useful for recording/reproducing wide-band signals such as video signals on/from a magnetic tape having a plastic tape base with a coated side on which a magnetizable layer has been deposited and a back side (hereinafter referred to simply as a transversely scanning magnetic tape recorder). Such recorders typically include a magnetic head arrangement on a head support rotatable about an axis parallel to the direction of tape movement. At least two magnetic heads are regularly spaced along the support circumference, so as to move along circular paths of equal diameter. A concave tape guide member with concavely curved tape guide portions engages the magnetic tape on each opposite side of the head support for guiding the magnetic tape in a locally transversely-curved shape past the circular paths of the magnetic heads. A first cylindrical tape guide upstream from the concave tape guide member, and a second cylindrical tape guide downstream from the concave tape guide member, guide the tape in a transversely straight shape the cross-section of the magnetic tape during its movement from upstream to the cylindrical downstream tape guide changing from flat to curved and then from curved to flat.

An apparatus of this type is described in the Netherlands Patent Application No. 75 00730 to which U.S. Pat. No. 4,012,787 corresponds, whose disclosure is hereby incorporated by reference. In this known apparatus the magnetic tape is guided by convex tape guide portions, in addition to the concave tape guide member. The convex surfaces are opposite but slightly offset axially from the concave surfaces. In other known recorders of this general type the tape is guided solely by the concave tape guide means, and a partial vacuum in a chamber between two concave tape guides draws the tape against the curved guide portions. The transition, in either of these recorder types, between the cylindrical and concave guides causes a rather substantial change of the shape of the magnetic tape. In a practical example the magnetic tape has a width of 1 inch and the head wheel is dimensioned so that the magnetic heads cover a path with a diameter which is also approximately 1 inch. This means that the magnetic tape at the location of the path of the magnetic heads covers approx. ⅓ of the circular path. The thickness of the magnetic tape for this example may be 20 to 30 microns (0.0008 to 0.0012 inches). Such considerable changes in the shape of a tape cannot readily be analyzed in order to calculate the stresses causes in the tape.

The transition from a straight to a curved shape gives rise to changes in the membrane stresses in the magnetic tape. In this respect membrane stress is to be understood to mean a material stress which is the result of forces acting in the plane of the magnetic tape. Experiments have revealed that changes in the membrane stress during the deformation of the magnetic tape may result in the local occurrence of kinking and folding and in irregular contact pressures between the magnetic tape and the magnetic head at the locations where these contact the magnetic tape.

The distance between the straight tape guides, the pre-tension which is exerted on the magnetic tape in the direction of transport, the type and the dimensions in thickness and transverse direction of the magnetic tape and the diameter of the concave guide means all influence the extent to which these effects occur. The distance between the straight tape guides also affects the minimum dimensions of the entire apparatus. The pretension in the magnetic tape influences the contact pressure between a magnetic tape and the magnetic heads and thus the wear of the magnetic tape and the magnetic heads, and it moreover governs the thickness of the magnetic tape to be used. The thickness of the magnetic tape influences the maximum playing time that can be achieved with a supply reel of a given size. The width of the magnetic tape determines the dimensions of the head disc and the height of the supply and the take-up reel, and also influences the minimum distance between the straight tape guides which will not give rise to kinking and folding of the magnetic tape, and thus the dimensions of the apparatus.

It is evident that in order to minimize the dimensions of a recorder for which the most important of the aforementioned factors have been predetermined, it will be attempted to arrange the straight tape guides at a minimal distance from each other. This is of particular importance for tape cassette recorders, for example as disclosed in the previously cited U.S. Pat. No. 4,012,787. When such a cassette is used the upstream and downstream straight magnetic-tape guides may consist of rollers which are disposed in the magnetic tape cassette. The distance between these rollers determines the dimension of the magnetic tape cassette, or has at least great influence on the dimensions.

Therefore, it is generally attempted to minimize the distance between the upstream and the downstream tape guides. The occurrence of kinks or folds in the magnetic tape is to be avoided at any cost, because these may give rise to permanent deformations in the magnetic tape and, furthermore, to dynamic effects which may affect the read-out of a signal which is recorded on the magnetic tape. It is very important to minimize the average contact pressure between the magnetic tape and the recording heads so that minimal wear of the magnetic heads and the magnetic tape will result. In this respect it is not only of importance that the membrane stress in the cross-section at the location of the paths of the magnetic heads has a low average, but also that as far as possible the membrane stress is constant throughout the cross-section. This aspect will be explained in more detail with reference to the drawing.

Regarding contact pressure between the magnetic tape and the magnetic heads, two effects must be clearly distinguished from each other. First of all the uniformity of the contact pressure may be adversely affected by the variation in the membrane stress owing to the change in shape of the magnetic tape from straight to arcuate. Secondly, an irregularity in the contact pressure occurs because the magnetic tape in the middle of a cross-section has a higher resistance to depression, that is, a greater local stiffness, than at the edges. (The "edge effect" known from mechanics).

Experiments have revealed that the minimum distance between the upstream and downstream tape guides for which no folds or kinks in the magnetic tape occur, in other words the optimal geometry of the tape guide arrangement, depends on several factors.

1. There is found to be a substantial dependence on the correct position of the upstream and downstream tape guides relative to the concave tape guide.
2. The minimum distance between the upstream and the downstream tape guide is substantially inversely proportional to:
   (a) the number of magnetic heads on the rotary head disc (because the number of magnetic heads for a specific given scanning speed of the magnetic heads along the magnetic tape determines the diameter of the head),
   (b) the average membrane stress in the magnetic tape, and
   (c) the square of the thickness of the magnetic tape.

SUMMARY OF THE INVENTION

It is an object of the invention to provide a transversely scanning magnetic tape recorder for which the distance between the upstream and downstream tape guides can be reduced below the minimum distance attainable so far, by providing special means which counteract the occurrence of kinks and folds in the magnetic tape.

In accordance with the invention tape curving means engage the part of magnetic tape which is disposed between the upstream cylindrical tape guide and the first downstream cylindrical tape guide on the opposite side of the concave tape guide member, and exert a local pressure on the magnetic tape at locations which in the same cross-section are disposed at equal distances from the edge of the magnetic tape and which locally increase the degree of curvature of the magnetic tape, so as to reduce the difference in local membrane stress in the magnetic tape in the cross-section of the magnetic tape at the location of the paths of the magnetic heads, which differences are the result of the variation in shape of the magnetic tape from straight to arcuate and subsequently again to straight.

It is found that by locally exerting pressure on the magnetic tape on the part between the upstream and the downstream magnetic tape guide and thus locally increasing the curvature of the magnetic tape the membrane stress variations in the cross-sections of the magnetic tape can be equalized. As a result of this the risk of kinking and folding of the magnetic tape is reduced and the uniformity of the contact pressure between the magnetic heads and the magnetic tape is improved. Thus, the effect of the invention is that the upstream and downstream tape guides can be disposed nearer each other than seemed to be attainable so far. In other words, in a magnetic tape recorder in which use is made of tape curving means in accordance with the invention the distance between the upstream and downstream tape guides can be selected so small that if the tape curving means were dispensed with, the magnetic tape in the part between these tape guides would exhibit folds and kinks.

In a preferred embodiment according to the invention, curving means are provided upstream as well as downstream of the concave tape guide member. It is found that in the case of a more or less symmetrical arrangement of the tape curving means relative to the concave tape guide member the occurrence of kinks and folds in the magnetic tape can be mitigated in the most effective manner.

The tape curving means in accordance with the invention can be very simple both in shape and construction. In a further preferred embodiment of the invention, the tape curving means has rounded pressure members which exert local pressure on the coating side of the magnetic tape, at a location which is nearer a cylindrical tape guide than the nearer concave tape guide portion. These pressure members may also be arranged more towards the concave guide member, but in that case their correct location becomes very critical, and very small deviations from the correct location cause a substantial reduction of affectiveness, so that again folding and kinking of the tape may result.

In a different preferred embodiment the tape curving means comprise pressure members which engage the back side of the magnetic tape near the edge of the magnetic tape, at a location nearer the concave tape guide member than a cylindrical tape guide. In this embodiment the effectiveness of the pressure member is maximum when the pressure members are near the concave tape guides, the correct location being not very critical.

In order to reduce unnecessary friction and wear, it is advantageous to employ an embodiment in which the pressure members are rollers journalled about a roller spindle arranged transversely to the local direction of movement of the magnetic tape.

The invention will hereinafter be described in more detail with reference to the drawing.

DESCRIPTION OF THE PREFERRED EMBODIMENTS

Figure 1:
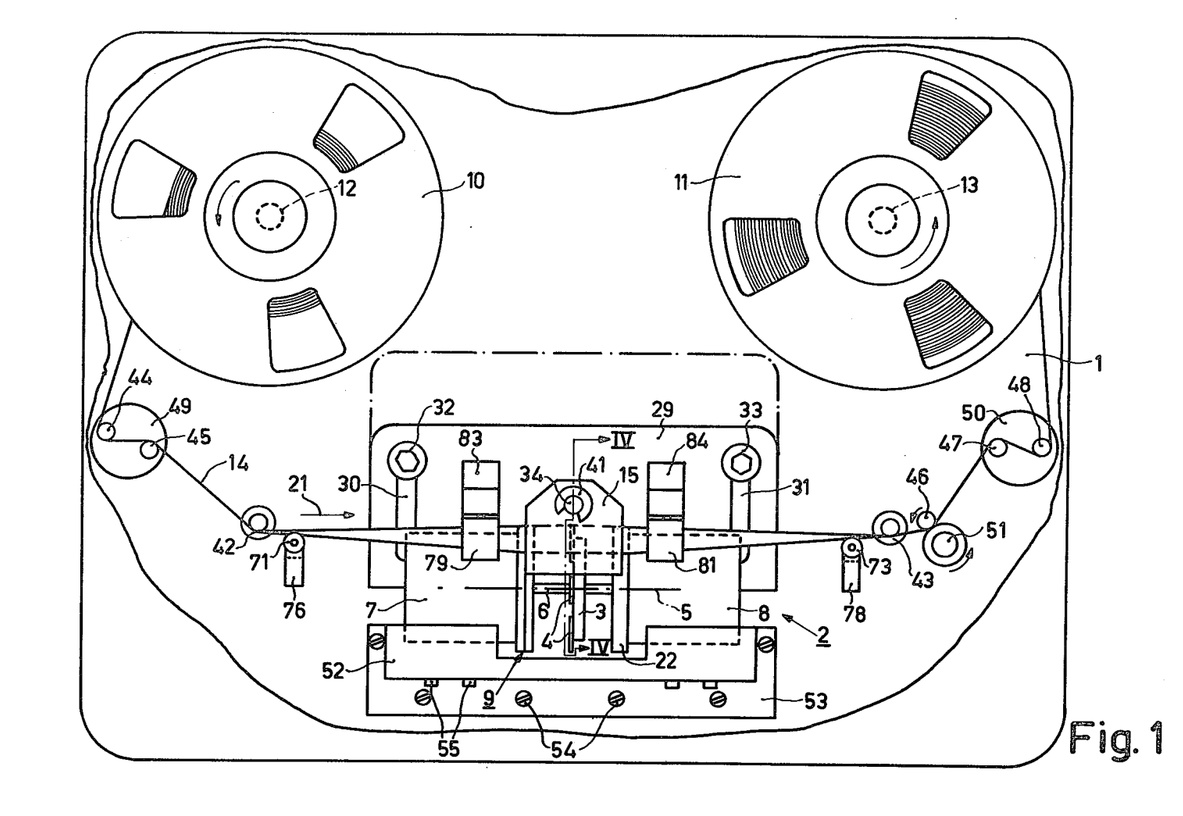
FIG. 1 is a plan view of a magnetic video tape recorder having two forms of additional curving means according to the invention.

The magnetic video tape apparatus of FIG. 1 has a deck 1 under which the various parts are located for mechanically driving different component parts of the apparatus, as well as the necessary electrical and electronic devices. Various guides and other parts are mounted on the deck 1, including a magnetic head arrangement 2 which includes a head support 3 on which a plurality of magnetic heads 4 are mounted, rotatable about an axis of rotation 5 which is represented by a dash-dot line. These and the other parts known from the prior art are described only summarily. For a more complete description reference is made to U.S. Pat. No. 4,012,787, cited above.

The head support 3 is mounted on a spindle 6 journalled in two coaxial drums 7 and 8. The video synchronizing head 9 supported by drum 7 is not critical for practice of the present invention and is described in Applicant's Netherlands Patent Application 74 16234 to which U.S. Pat. No. 4,024,583 corresponds, hereby incorporated by reference.

Figure 3:
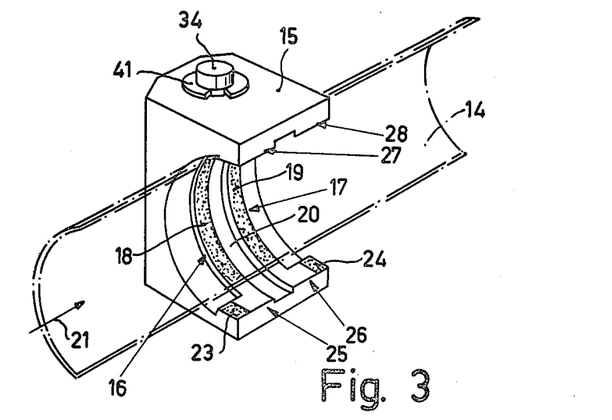
FIG. 3 is a perspective view of a concave tape guide used in the embodiment of FIG. 1.

On the deck 1 a supply reel 10 and a take-up reel 11 driven by spindles 12 and 13 rotate counterclockwise to pay out magnetic tape 14 which is passed along the magnetic head arrangement 2 and is then wound onto the take-up reel 11. The magnetic tape 14 consists of a plastic base with a magnetizable coating on the side facing the magnetic head arrangement 2, and with a back side Facing a concave tape guide member 15. As shown in FIG. 3, the member 15 has concave guide portions 16 and 17 which engage the tape 14 on both sides of the head support 3 at circular cylindrical contact faces 18 and 19 having a diameter which equals the diameter of the path of the magnetic heads 4. Between these two contact faces a gap 20 is disposed at the location of the path of the magnetic heads 4. The tape guide portions 16 and 17 align the magnetic tape 14 in a locally transversely curved shape along the circular paths of the magnetic heads 4, in a longitudinal direction of movement represented by arrow 21 parallel to the axis of rotation 5 of the head support 3.

Figure 5:
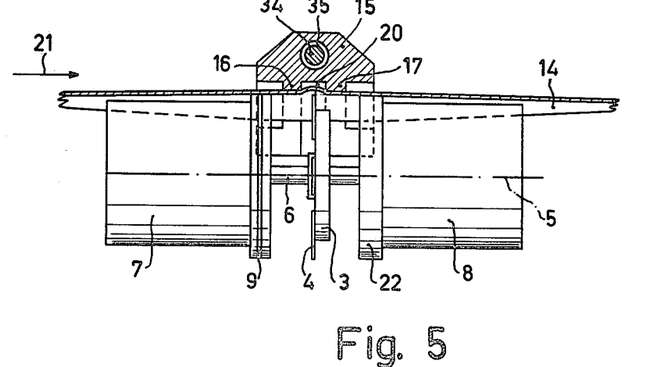
FIG. 5 is a sectional plan view of the concave tape guide member with the magnetic tape and convex tape guide members of FIG. 1.

As shown particularly in FIG. 5, tape curvature and alignment is further aided by convex tape guide members which consist of the video synchronizing head 9 on one side of the head support 3 and a flange 22 of the drum 8 on the other side, these members having a diameter corresponding to that of the concave faces 18 and 19. Between the video synchronizing head 9 and the flange 22 and the concave guide portions 16 and 17 there is always a gap where the magnetic tape is entirely free of contact with stationary parts of the recorder.

The concave tape guide member 15 is aligned using four concave supporting faces 23 and 24, two of which are shown dotted in FIG. 3, which form part of four supporting members 25 through 28 that are integral with the guide portions 16 and 17 and are extensions of the circular cylinder of the contact faces 18 and 19. In the operating condition, see for example FIG. 1, FIG. 4 and FIG. 5, the concave supporting faces bear against the convex tape guide members 9 and 22 and thus position the concave tape guide member 15 relatively to the two drums 7 and 8 and thus also relative to the head support 3.

Figure 2:
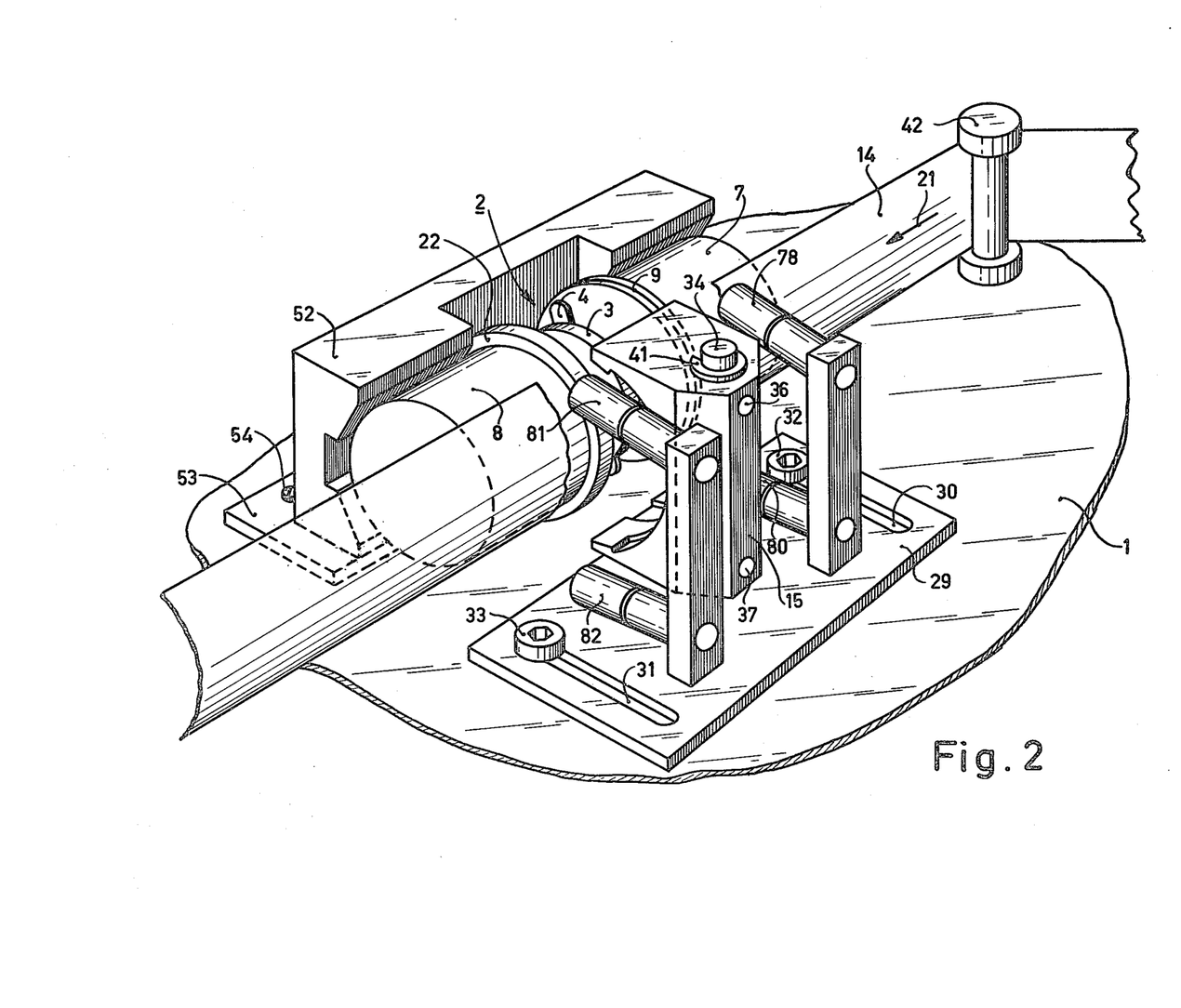
FIG. 2 is an enlarged perspective view of the tape guide arrangement of the apparatus of FIG. 1, but having only back-side pressure members.
Figure 4:
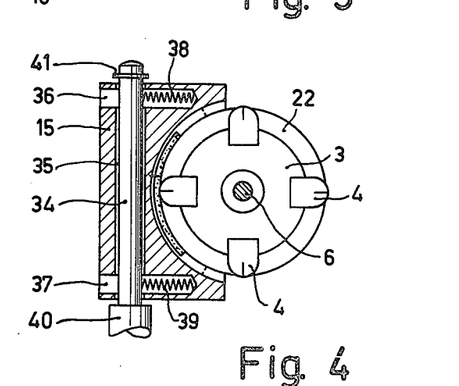
FIG. 4 is a cross-section of the guide of FIG. 3 also showing the magnetic heads.

The tape guide member 15 is mounted on a slide 29 movable between the operating position shown in FIG. 1 and a retracted rest position shown in FIG. 2. This movement is guided by slots 30 and 31 which cooperate with two guide bolts 32 and 33 on the deck 1. As shown in FIG. 4, the concave tape guide member 15 is mounted loosely on the slide 29 by a pin 34 passing through an oversized bore 35, and is axially movable between a shoulder 40 and a retaining ring 41. Pressure springs 38 and 39 located in blind holes 36 and 37 urge the member 15 toward the convex members 9 and 22. Because of the axial and radial play of the member 15 relative to the pin 34, it is possible for the concave tape guide member in the operating condition to assume a position which is entirely determined by the concave supporting members 25 through 28 in their co-operation with the convex tape guide members 9 and 22. This enables an excellent alignment to be obtained, fully independent of tolerances in the location of the pin 34 and also independent of the force with which the concave tape guide member 15 is loaded by the two springs 38 and 39. Moreover, this force has no influence on the force which is exerted on the magnetic tape 14, because there is a gas between the convex tape guide members 9 and 22 and the concave tape guide members 16 and 17 where the tape is entirely free of contact with parts of the magnetic tape apparatus.

On the deck 1 cylindrical tape guides in the form of tape guide rollers 42 and 43 are fixed in position on opposite sides of the magnetic head arrangement 2. The tape guide roller 42 constitutes the first, upstream cylindrical tape guide, and the second tape guide roller 43 is the first downstream cylindrical tape guide. Between the tape guide rollers 42 and 43 the shape of the magnetic tape cross-section changes from straight at the location of the cylindrical roller 42, to curved in accordance with the shape of the concave tape guide portions 16 and 17 and again to straight at the location of the cylindrical roller 43. In addition to the rollers 42 and 43, cylindrical tape guides 44, 45, 47 and 48 are mounted in pairs on components part 49 and 50 respectively, pivotable to a limited extent to provide a correct tensile force in the magnetic tape 14. Such components are generally known in tape recorder technology. A capstan 46 also cooperates with a pressure roller 51 to drive and guide the tape.

Opposite the movable slide a stationary mounting block 52 mounted on a flange 53 fixed to the deck 1 by screws 54. The mounting block has an accurate V-shaped groove against which the cylindrical outer surfaces of the drums 7 and 8 are pulled by screws 55, to provide accurate and stable alignment.

Figure 6:
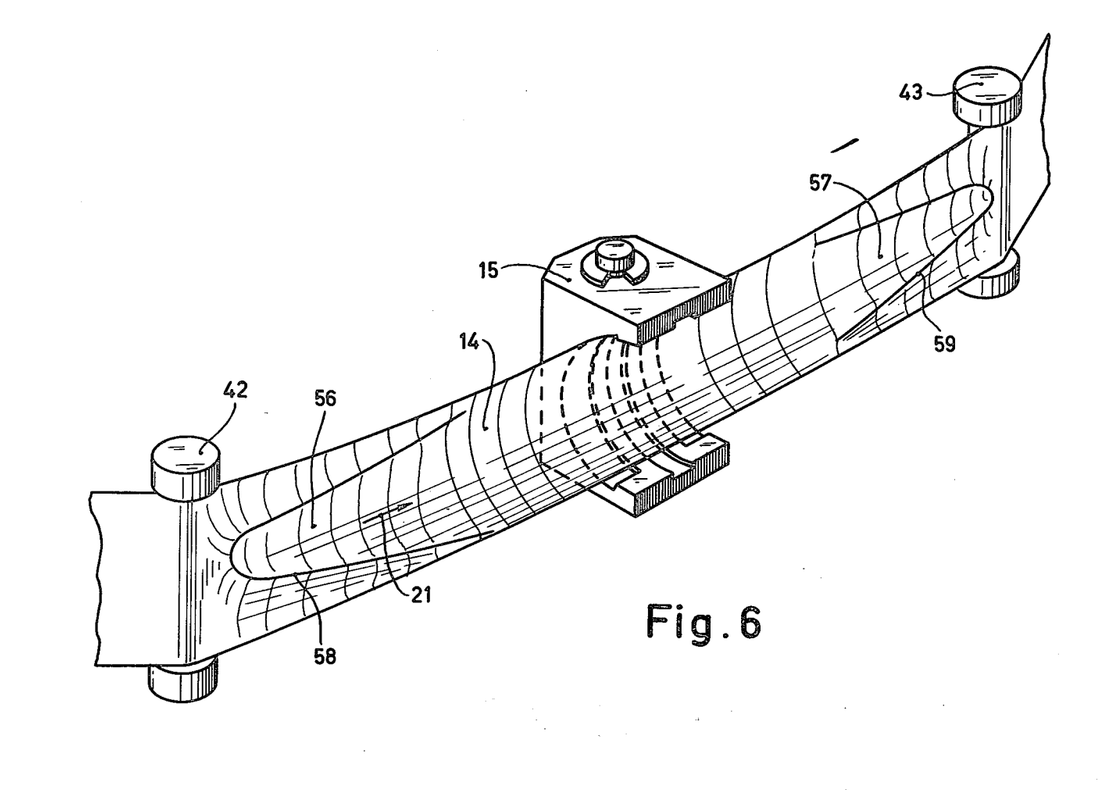
FIG. 6 is a perspective view of a magnetic tape and only prior art guides, folds being formed in the magnetic tape.
Figure 7:
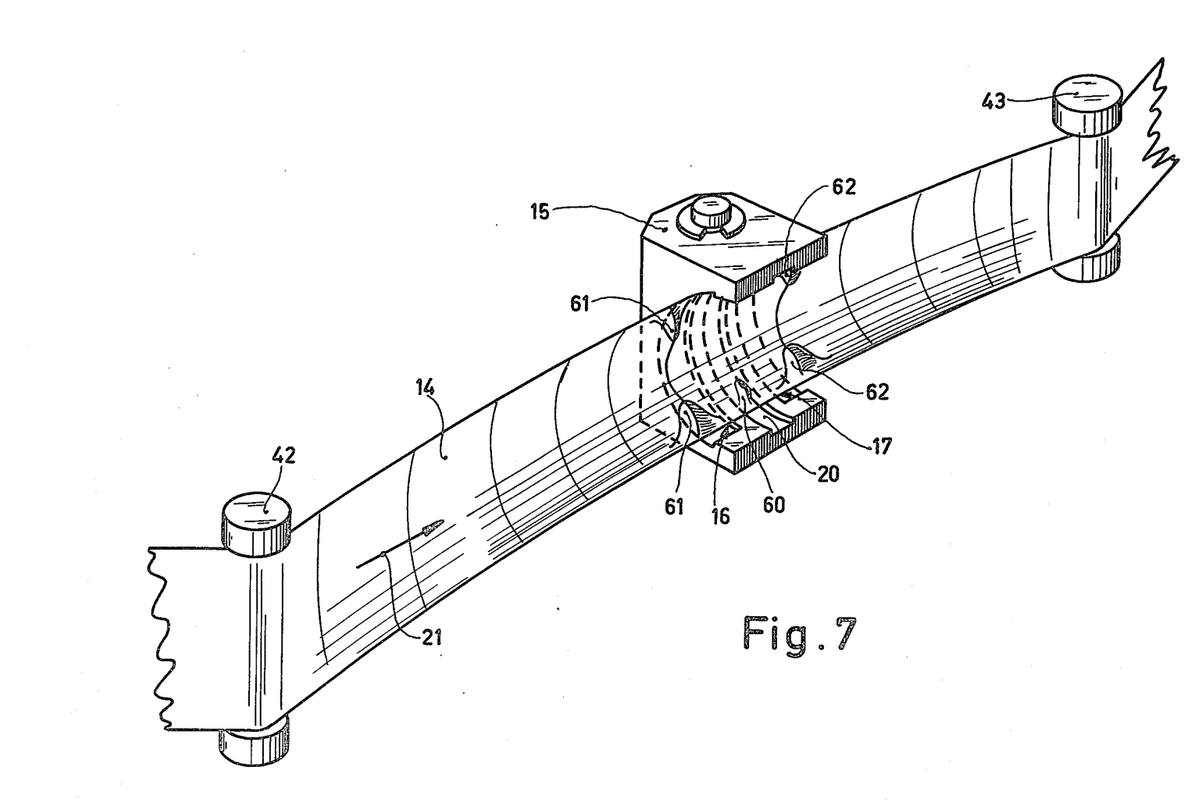
FIG. 7 shows a similar view as FIG. 6, but now with the magnetic tape being kinked.

FIGS. 6 and 7 illustrate some undesired effects which may occur because the cross sectional shape of the tape changes from straight to curved and again to straight. The nature of the effects which occur greatly depends on the distance of the cylindrical and the concave tape guide relative to the axis of rotation 5 of the head support 3. In the situation shown in FIG. 6 the tape guide rollers 42 and 43 are disposed comparatively far from the axis of rotation 5. Upstream and downstream from the concave tape guide member 15 two folds 56 and 57 may then be formed, which are each bounded by comparatively sharp bounding lines 58 and 59 respectively. At these bounding lines the material of the magnetic tape 14 is subjected to a rather abrupt kink. This is particularly so in the case of fairly thin magnetic tape and may give rise to permanent damage to the magnetic tape. Modern magnetic tape materials for use in magnetic video tape equipment frequently have a very small thickness, so as to obtain a long playing time. As an example, magnetic tapes are used with a thickness of the order of 15 microns, which tapes are highly vulnerable.

FIG. 7 illustrates some effects which may occur when the tape guide rollers 42 and 43 are disposed comparatively near the axis of rotation 5. At the location of the slot 20 of the concave guide member 15 kinks 60 are formed near the edge of the magnetic tape 14. Moreover, similar kinks 61 and 62 are formed upstream and downstream from the concave tape guide means 13 and 17 respectively. These also have a harmful effect on the magnetic tape 14, and the kinks 60 moreover prevent a correct cooperation between the magnetic heads 4 and the magnetic tape 14. At the location of the kinks 60, 61 and 62 the membrane stress in the magnetic tape 14 changes from a tensile stress into a compressive stress. As the magnetic tape cannot withstand compressive stresses a kink is formed.

Figure 8:
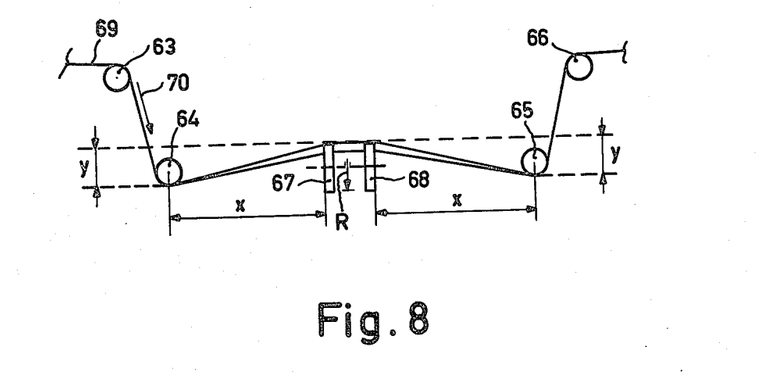
FIG. 8 is a schematic view of a measuring arrangement for examining the influence of certain parameters on the occurrence of folds and kinks in magnetic tape.

FIG. 8 illustrates the principle of a measuring arrangement which was used for determining the influence of the geometric position of the tape guides relative to each other. For this purpose, a magnetic tape having a width of 1 inch and a thickness of 23 microns was passed over a plurality of cylindrical tape guide members 63 through 66 and also over two coaxial disc-shaped tape guides 67 and 68 with a radius of 13 mm. All tape guides were stationary. A tensile force of 150 gf was exerted on the magnetic tape 69. The direction of movement of the magnetic tape is indicated by an arrow 70. The magnetic tape contacts the cylindrical tape guides 64 and 65 at a location which is disposed at a distance of y mm from the location where the magnetic tape contacts the disc-shaped tape guides 77 and 78. Each of the cylindrical tape guides is disposed at distance x from the nearest disc-shaped tape guide.

Figure 9:
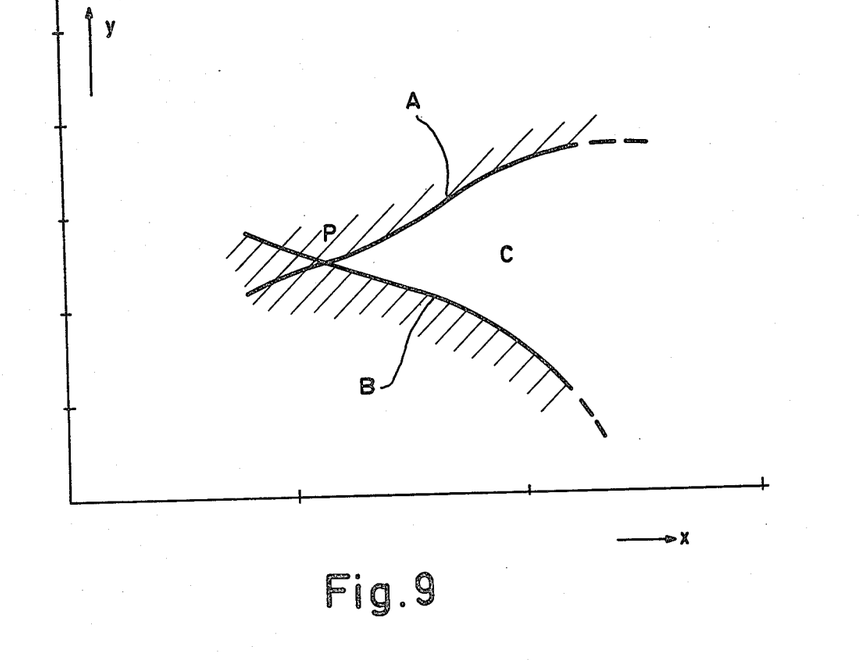
FIG. 9 is a graph of the areas where kinks and/or folds occur, depending on the parameters x and y indicated in FIG. 8.

FIG. 9 graphically represents two areas which can be distinguished from each other by the shading and which are bounded by two curves, designated A and B respectively. The curve A bounds the area in which folds of the type shown in FIG. 6 are formed in the magnetic tape. Curve B bounds the area in which kinks of the type shown in FIG. 7 are formed in the magnetic tape. Between the curves A and B an area C is disposed in which the magnetic tape is not folded or kinked. The curves A and B intersect each other in a point D. It is found that the distance x should not be less than 53 mm for a distance y of 2.5 mm.

Figure 10:
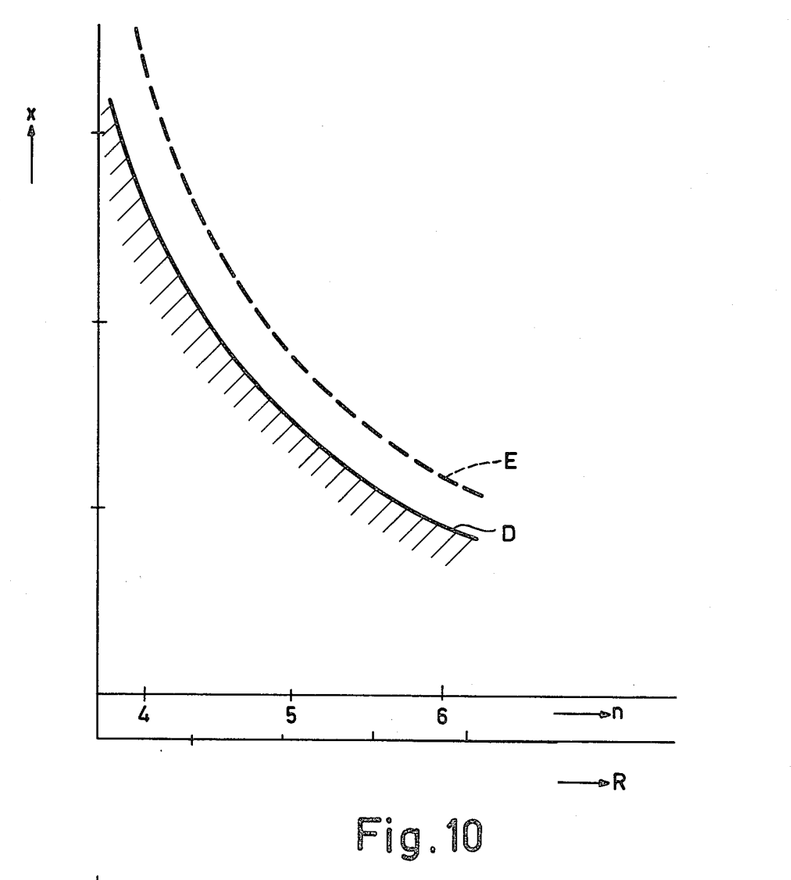
FIG. 10 is a graph with an area where folds and/or kinks occur, depending on a parameter x of FIG. 8 and the number of magnetic heads n.

FIG. 10 illustrates the effect of the radius R of the disc-shaped tape guide members 67 and 68 on the distance x which is still usable. This is related to the number n of magnetic heads used. The measurements were performed on a magnetic tape with a thickness of 30 microns and a tape width of 1 inch, the distance y always being optimized. The curve D relates to measurements during which the force produced in the magnetic tape was 120 gf, while the curve E refers to a force of 75 gf. The shaded area below the curve D is not usable.

Figure 11:
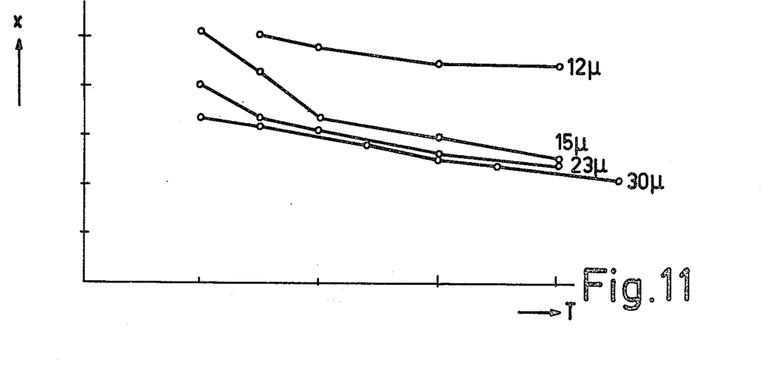
FIG. 11 illustrates the relationship between a minimum x in accordance with FIG. 8 and a tensile force T in a magnetic tape, depending on the thickness of the magnetic tape.

FIG. 11 illustrates the relationship between the tensile force T in gf produced in the magnetic tape and the minimum distance x in millimeters, for different magnetic tapes with a thickness varying from 12 to 30 microns at a width of 1 inch.

Figure 12:
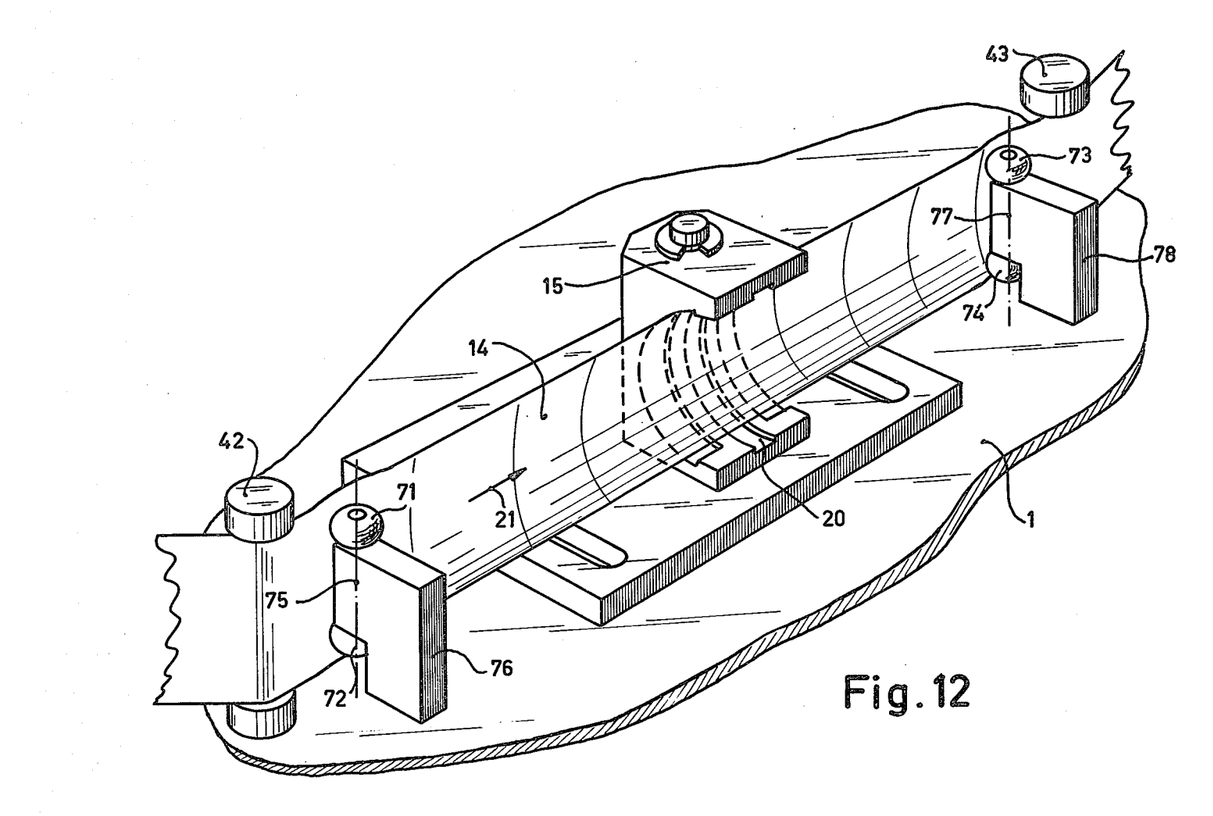
FIG. 12 is a perspective view of a guide arrangement having a coated-side curving means in accordance with the invention.
Figure 13:
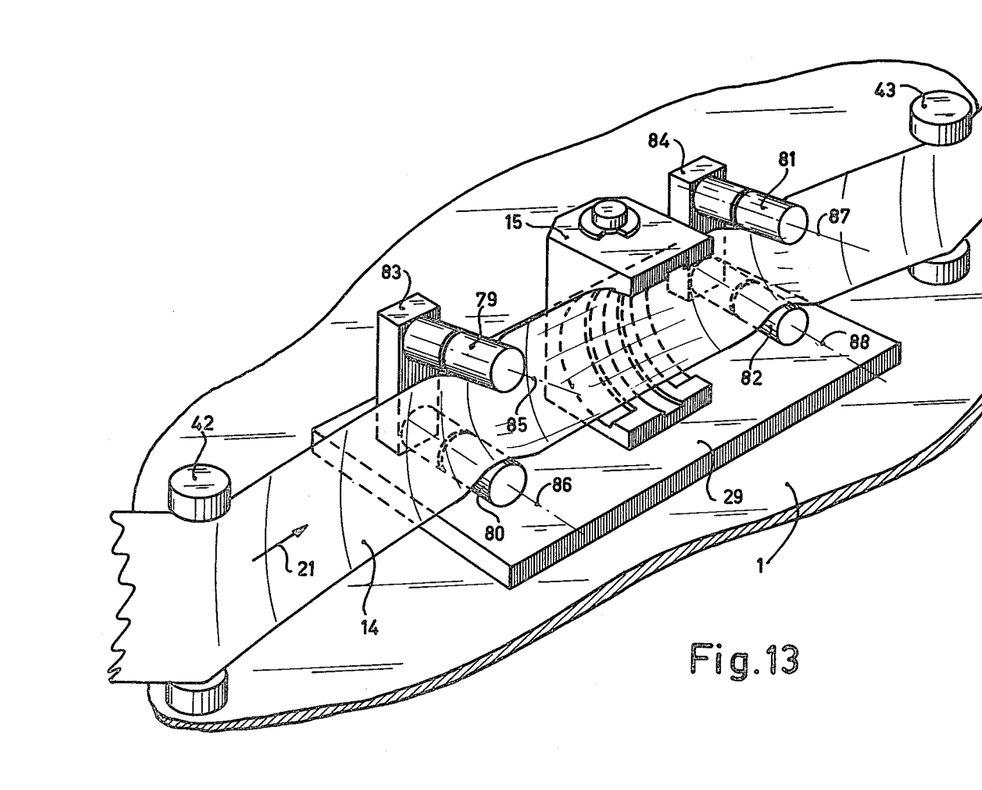
FIG. 13 is a different perspective view of the embodiment of FIG. 2 showing the effect of the tape curving means.

It is found that, in accordance with the invention, it is nevertheless possible to reduce the distance between the cylndrical tape guides further, by the use of tape curving means which exert a local pressure on the magnetic tape and thus locally give the magnetic tape a greater degree of curvature. FIGS. 12 and 13 show such tape curving means. The tape curving means in FIG. 12 uses spheres 71 through 74, which locally exert pressure on the coating side of the magnetic tape 14, namely at two cross-sections of the magnetic tape which are disposed nearer the tape guide rollers 42 and 43 respectively than near the concave portion of the tape guide member 15. The spheres 71 and 72 exert a local pressure at approximately equal distances from the edges of the magnetic tape 14 and cause a local increase in curvature of the magnetic tape, which further downstream at the location of the slot 20 of the concave tape guide member 15 cause a local change in the membrane stress and thus prevents the occurrence of positive compressive stresses. The two spheres 71 and 72 are mounted for rotation about an axis of rotation 75 on a support 76 rigidly connected to the deck 1. The spheres 73 and 74 are also rotatable about an axis of rotation 77, and are mounted on the support 78. By using similar tape curving means in a measurement arrangement in accordance with FIG. 8 the distance x could be reduced to 70% of the original minimum value. The distance between the supports 76, 78 and the cylindrical tape guide members 64 and 65 was then approximately 7 mm and the distance between the spheres 71, 72 and 73, 74 respectively was approximately 17 mm.

A different type of curving means is shown in FIG. 13, and in FIG. 2. These means comprise pressure members in the form of four cylindrical rollers 79 through 82. The surface of the rollers might also be curved, as the case may be with a very specific calculated or empirically determined curvature, so as to optimize the effect. They engage the back of the tape near the upper and the lower edges. The two rollers 79 and 80 cooperate with the magnetic tape at the same longitudinal location or cross-section, which cross-section is nearer the concave tape guide member 15 than the upstream cylindrical tape guide member 42. For the rollers 81 and 82 a symmetrically similar location is chosen, but now relative to the downstream tape guide 43. The rollers are rotatably mounted about axes 85, 86, and 87, 88 on two supports 83 and 84 respectively which are secured to the slide 29. These roller axes, and also the axes of rotation 75 and 77 of the spheres 71 through 74 of FIG. 12, are always perpendicular to the direction of movement 21 of the magnetic tape. It is found that in a measuring arrangement in accordance with FIG. 8 the distance x could be reduced to 60% of the original minimal value by the use of rollers as shown in FIG. 13.

In FIG. 1 the different methods shown in FIGS. 12 and 13 for locally increasing the curvature of the magnetic tape 14 are used at the same time. In general, this will not be necessary.

The invention is not limited to the embodiments shown. It is found that different means which locally exert a pressure on the magnetic tape between a cylindrical guide member and the concave guide member, and thus produce a local increase of the degree of curvature of the magnetic tape, can be used with success. It is for example not necessary that rolling pressure members are used; stationary pressure members can also be employed. However, in view of friction, rolling pressure members are to be preferred.

Although FIG. 1 shows a tape apparatus with separate reels, the invention is also applicable, in a very satisfactory manner and probably even more advantageously, in a magnetic tape cassette recorder, for example in accordance with the previously cited U.S. Pat. No. 4,012,787. In this case it may be possible to use tape curving means which, like the tape curving means 79 through 82 in FIG. 13, engage the back of the magnetic tape and are formed integral with the housing of the cassette which is used. As is for example evident from FIG. 8, the magnetic tape is moved to the inside of a cassette housing through a distance y when a magnetic tape cassette is brought into the operating position, so that possible tape curving means of that type could thus automatically be brought into contact with the back of the magnetic tape.

What is claimed is:

1. A tape guide arrangement for a transversely scanning magnetic tape recorder comprising:

rotary magnetic head means for scanning a coated side of a tape in the recorder, including at least one head rotated about an axis parallel to a longitudinal direction of tape travel, concavely curved tape guide means for guiding the tape in a locally transversely curved shape past the head means, said guide means having one concave guide portion disposed upstream from the head means and another concave guide portion disposed downstream from the head means, at least first and second cylindrical tape guides for guiding the tape in a transversely straight shape, said first cylindrical guide being disposed upstream and spaced a given distance from said one guide portion, said second cylindrical guide being disposed downstream from the other guide portion, the shape of the magnetic tape cross-section during its movement from said upstream cylindrical guide to said downstream cylindrical guide changing from straight to curved and subsequently again from curved to straight, and additional means for curving the tape disposed between said first cylindrical guide and said one guide portion, said additional means including at least one member which exerts a local pressure on the tape at equal distances inward from the edge of the magnetic tape to locally increase the degree of curvature of the tape so as to reduce differences in local membrane stress in the cross-section of the magnetic tape at the location of the scanning paths of the magnetic head means.

2. A guide arrangement as claimed in claim 1, including a second additional means for curving the tape disposed between said another concave guide portion and the second cylindrical guide.

3. A guide arrangement as claimed in claim 1 wherein said member is a rounded pressure member arranged to exert local pressure on the coated side of the magnetic tape at a location nearer said first cylindrical tape guide than said nearer guide portion.

4. A guide arrangement as claimed in claim 3 wherein said member is a curved body of revolution mounted for rotation about an axis transverse to said direction of tape movement.

5. A guide arrangement as claimed in claim 4 wherein the means for curving includes two such members, symmetrically curved and arranged symmetrically with respect to the edges of the tape.

6. A guide arrangement as claimed in claim 4 wherein said element is a sphere.

7. A guide arrangement as claimed in claim 1 wherein said additional means for curving comprises two pressure members arranged to contact the side of the tape opposite said coated side at symmetrically arranged locations near the edge of the magnetic tape, at a location closer to the concave guide member than to the first cylindrical tape guide.

8. A guide arrangement as claimed in claim 7 wherein said guide members are cylindrical rollers each mounted for rotation about an axis transverse to said direction of tape movement.

* * * * *